United States Patent

Maloney

[15] 3,670,305

[45] June 13, 1972

[54] LENSLESS OPTICAL RECOGNITION SYSTEM

[72] Inventor: William T. Maloney, Sudbury, Mass.

[73] Assignee: Sperry Rand Corporation

[22] Filed: Sept. 30, 1970

[21] Appl. No.: 76,869

[52] U.S. Cl. ....................340/146.3 P, 350/3.5

[51] Int. Cl. ....................G06k 9/00, G02b 27/38

[58] Field of Search ....................340/146.3, 146.3 P; 350/3.5

[56] References Cited

UNITED STATES PATENTS

| | | | |
|---|---|---|---|
| 3,064,519 | 11/1962 | Shelton | 340/146.3 P |
| 3,195,396 | 7/1965 | Horwitz et al. | 340/146.3 P |
| 3,196,392 | 7/1965 | Horwitz et al. | 340/146.3 P |
| 3,408,143 | 10/1968 | Mueller | 340/146.3 P |
| 3,543,237 | 11/1970 | Cutler et al. | 340/146.3 P |

*Primary Examiner*—Thomas A. Robinson
*Attorney*—S. C. Yeaton

[57] ABSTRACT

A lensless recognition system including a hologram having interference patterns therein corresponding to known characters. The interference patterns are formed by a character beam which passes through a transparent mask of the character to be recorded and intersects a reference beam on a photographic plate. In the recognition process quasi-monochromatic incoherent illumination from an unknown character transmits through the hologram which is obtained by developing and bleaching the photographic plate. Correlated output signals of varying intensity are formed in the output plane at the locations occupied during the recording process by the transparent masks which most closely correspond to the unknown character. Each of a plurality of pinholes positioned at the locations corresponding to each mask transparency transmits the central value of a correlated output signal. A photodetector aligned with each pinhole senses the transmitted central value and produces a current signal that is processed in a postprocessor to provide an output signal that is indicative of the corresponding known character.

12 Claims, 2 Drawing Figures

INVENTOR.
WILLIAM T. MALONEY
BY
HP Terry
ATTORNEY

INVENTOR.
WILLIAM T. MALONEY
BY
HP Terry
ATTORNEY

LENSLESS OPTICAL RECOGNITION SYSTEM

BACKGROUND OF THE INVENTION

1. Field of the Invention

The present invention relates to the art of optical recognition systems and more specifically to those systems that employ spatial filtering for the recognition of self-luminous or incoherently illuminated characters. The term character as used herein encompasses patterns and features of characters, for example the crossbar in the letter A and includes subfeatures of characters, for example, if the aforementioned crossbar were divided into three segments each segment would be considered to be a subfeature.

2. Description of the Prior Art

It is known in the art of optical recognition systems that recognition of self-luminous or incoherently illuminated characters is possible if the point spread of an isoplanatic optical system (also known as a shift invariant optical system) is properly designed. Prior art isoplanatic optical systems have employed holograms to obtain a properly designed point spread. However, these systems are limited because they incorporate imaging devices which employ a lens that must be very well corrected for aberrations. In actual practice, this limitation requires that the mask containing a character to be recorded on the photographic plate be positioned relatively close to the system axis. This restriction on the position of the mask places an upper limit on the angle between the beams striking the photographic plate during the recording process. The hologram for a reasonable emulsion thickness is capable of high diffraction efficiency if the angle between the character beam and the reference beam striking the hologram can be increased. However, the limitation which requires the mask to be positioned relatively close to the system axis limits the diffraction efficiency of the hologram. Further, in the recognition process, a substantial amount of light is lost to undesired diffraction orders when the recording angle between the character and the reference beams is low.

In order to increase the efficiency of the hologram and record a great number of mask transparencies in the presently existing recognition systems which include imaging devices, a larger and more expensive lens is required to accommodate masks which are not positioned relatively close to the system axis.

SUMMARY OF THE INVENTION

The disclosed invention is an optical recognition system which uses a hologram having a plurality of interference patterns that correspond to many different mask transparencies of known characters. Quasi-monochromatic incoherent illumination from an unknown character transmits through the hologram and a maximum intensity function of a correlated signal is formed at an aperture which is disposed in the same location as that occupied during the recording process by the mask transparency that contained the most closely corresponding character. This aperture is one of a plurality of aperture discriminators, each of which is disposed to be coincident with the position occupied by the mask transparency of a known character during recording and to pass the central value of the intensity function formed at the aperture. Positioned behind each aperture is a photodetector that produces an electrical current signal in response to the central value of the intensity function received from each aperture. The photodetector electrical current output signals are processed in a postprocessor that provides an output signal indicative of the corresponding known character which is most similar to the unknown character to be recognized. This device provides an economical lensless character recognition system and allows a modest quality lens to be used for recording the hologram.

DESCRIPTION OF THE PREFERRED EMBODIMENT

Figure 1:
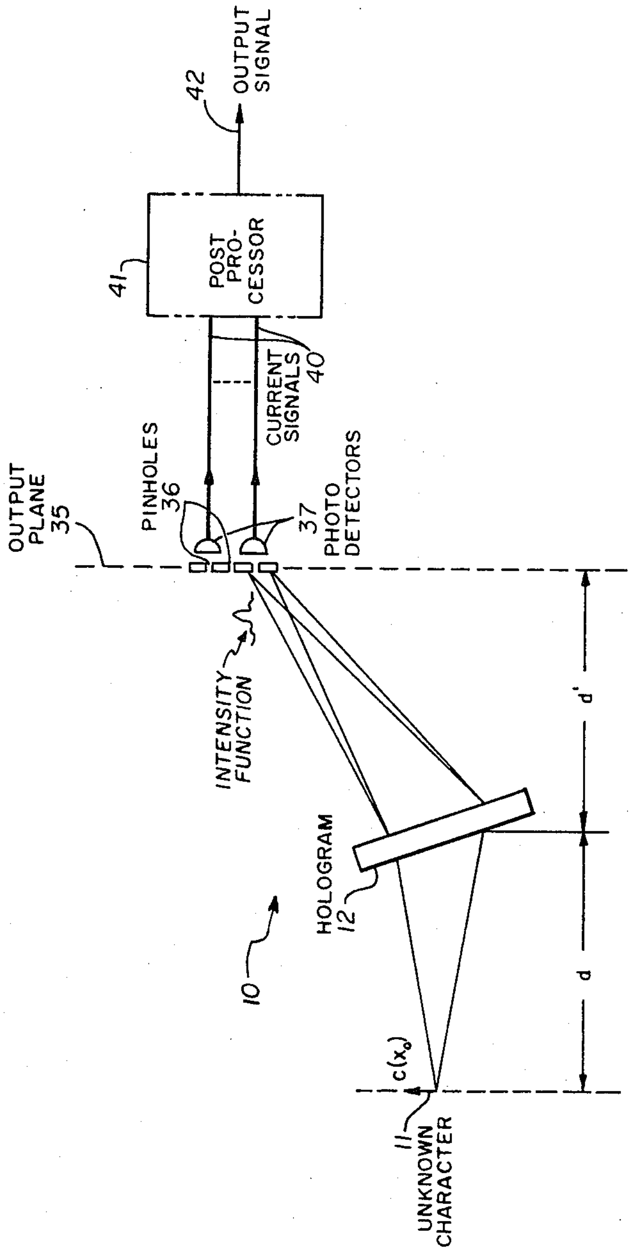
FIG. 1 is a simplified schematic diagram of a lensless optical recognition device incorporating the invention.

The present embodiment will be described with reference to FIG. 1. As shown in FIG. 1, a lensless recognition system 10 receives incoherent quasi-monochromatic illumination from an unknown character 11. The received illumination impinges on the left side of a hologram 12 which is incorporated in the lensless recognition system 10. The unknown character 11 may be self- luminous such as a neon-type sign, a filtered oscilloscope trace or it may be incoherently illuminated from a separate source. The incoherent illumination from the unknown character 11 is diffracted by a plurality of interference patterns disposed within the hologram 12. As the incoherent illumination transmits through the hologram 12 a correlation is performed between the incoherent illumination and the library of mask transparencies represented by the interference patterns.

Figure 2:
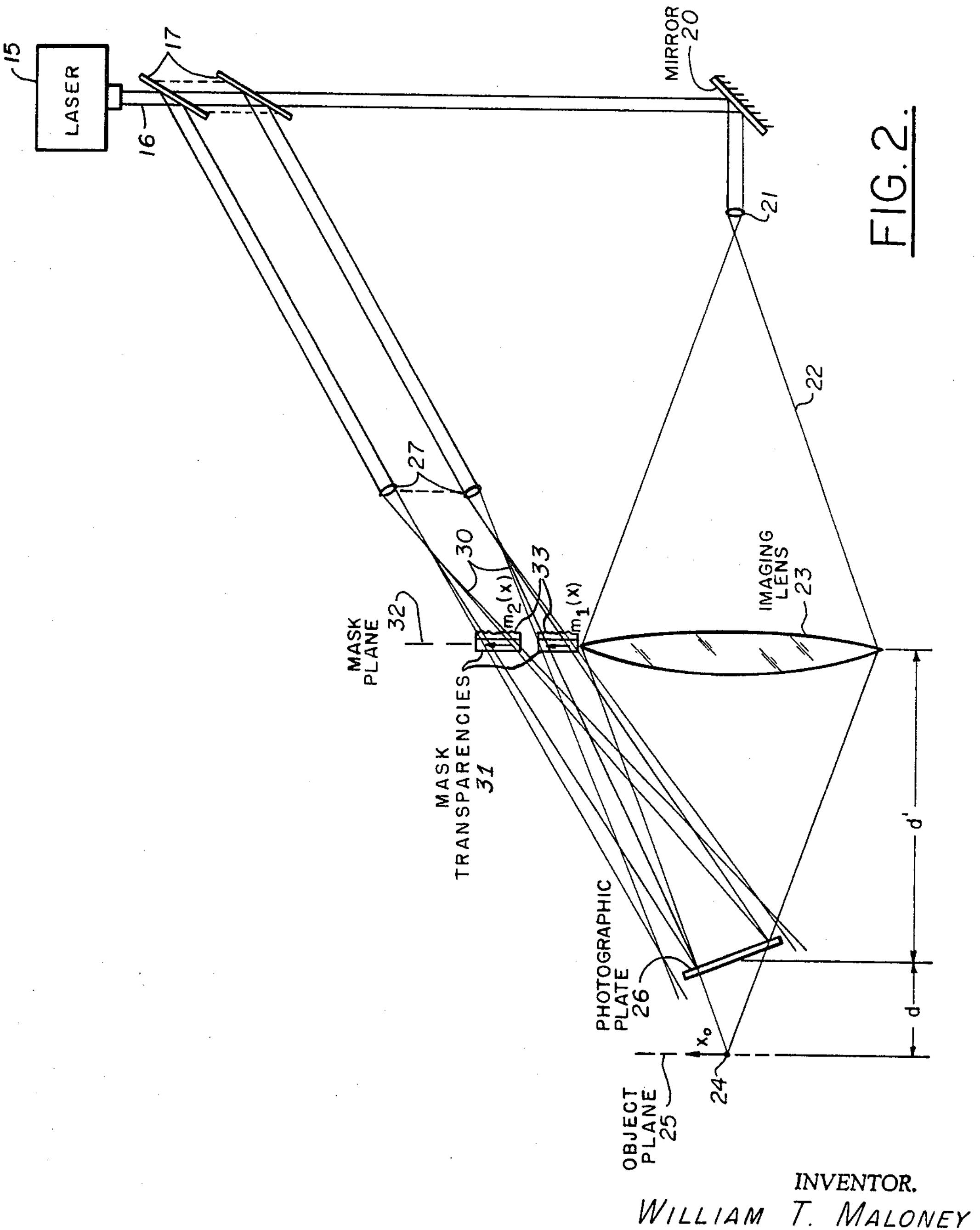
FIG. 2 shows schematically an apparatus used in recording the mask transparencies of known characters onto a photographic plate.

FIG. 2 illustrates a method for recording holograms on a photographic plate that includes a laser light source 15 for emitting a coherent light beam 16 which is directed onto a beamsplitter 17. Partial transmission of the coherent light beam 16 through the beamsplitter 17 is received by a mirror 20 and reflected from its highly reflective surface to a converging lens 21. The converging lens 21 forms a coherent reference beam 22 from the partial transmission of the coherent light beam 16. The coherent reference beam 22 is focused on an imaging lens 23 thereby producing a spherical wavefront that converges to a diffraction spot at the reference point 24. The reference point 24 is disposed within an object plane 25 which is located a distance d to the left of a photographic plate 26. The distances *d* and *d'* of FIG. 1 are equal respectively to the distances *d* and *d'* of FIG. 2 when the wavelength of the incoherent illumination from the unknown character 11 in FIG. 1 is approximately equal to the wavelength of the laser 15 in FIG. 2. However, if these wavelengths are not approximately equal, the distances *d* and *d'* used in the recognition process shown in FIG. 1 will not be equal respectively to the distances in the recording process. Variation in these distances will be required where possible to compensate for differences in the wavelengths.

The imaging lens 23 is required to produce a diffraction spot at the reference point 24 that is small relative to the line thickness of a character to be recorded. Further, the imaging lens 23 must be isoplanatic over dimensions which are of the same order of magnitude as the width and height of the recorded characters.

The remaining portion of the coherent light beam 16 is reflected from the beamsplitter 17 to a converging lens 27 thereby forming a coherent character beam 30. The coherent character beam 30 is transmitted through a filter mask transparency 31 located in a mask plane 32 impinging on the entire useful area of the photographic plate 26 which is positioned a distance *d'* to the left of the mask plane 32. Diffusers 33 may be employed to improve distribution of the illumination from the signal beam 30 over the useful surface area of the photographic plate 26. Simultaneously, the spherical wavefront from the imaging lens 23 impinges on the photographic plate 26 overlapping the character beam 30. Illumination of the photographic plate 26 by the coherent beams 22 and 30 forms an interference pattern corresponding to the mask transparency of a known character.

In the mask transparencies generally used for recording the area occupied by the character is black and the adjacent areas are white; however, negative mask transparencies, i.e., those in which the area occupied by the character are white and the adjacent areas are black, may be utilized in specific applications to obtain increased discrimination.

A plurality of interference patterns corresponding to many different mask transparencies of known characters may be recorded sequentially on the photographic plate 26. In order to record a plurality of interference patterns corresponding to a large alphabet of masks, the photographic plate 26 must have a reasonable emulsion thickness and the recording angle must be different for each mask transparency 31 positioned within the mask plane 32 as shown in FIG. 2. The emulsion must be of sufficient thickness to enable Bragg diffraction planes to be formed within the emulsion by the interference between the coherent reference beam 22 and the character beam 30. These planes define regions of high and low absorption and are characteristic of thick film holographs in which the spacing between interference fringes for each character formed by the interference of the coherent reference beam 22 and the character beam 30 is considerably smaller than the thickness of the film.

Alternatively, a plurality of interference patterns may be recorded on the photographic plate 26 by restricting the signal beam 30 to only a relatively small portion of the photographic plate 26. The recording angle is also varied for each mask transparency 31 in this method. As a result, the interference patterns corresponding to each mask transparency 31 are spatially displaced from right to left and from top to bottom within the photographic plate 26.

In the above recording operations, it is necessary that the photographic exposures be properly scaled to normalize character areas. An alternate procedure would be to adjust the effective areas of the holograms after development and bleaching. Still another procedure is described below with respect to scaling the outputs of photodetectors 37.

After recording a desired number of filter mask transparencies, the photographic plate 26 is developed and bleached to produce a Bragg phase hologram, wherein the regions of high and low absorption are converted to regions of high and low refractive index.

The lensless recognition device 10 incorporates the hologram 12 as shown in FIG. 1. An unknown character 11 is positioned relative to the hologram 12 so that it exactly corresponds to the position of the reference point 24 in the object plane 25 of FIG. 2 relative to the photographic plate 26. When the registration of the unknown character 11 is completed, incoherent quasi-monochromatic light from the unknown character 11 transmits through the hologram 12 producing an intensity distribution that will occur in the output plane 35. When the unknown character is a point source this response is known variously as the intensity impulse response, the intensity point spread or the intensity Green's function.

The essence of the system operation is based on the fact that when the hologram 12 is illuminated from the left by a point source as expressed by the Dirac delta function $\delta(x_o - \bar{x})$ which is quasi-monochromatic, an intensity distribution expressed as $|m(x+\bar{x})|^2$ will occur in the output plane. The response of the hologram 32 to a more complex input character $|c(x_0)|^2$ is the sum of the intensity point spread functions arising from each point on the character and expressed as:

$$R=\int |c(x_0)|^2\, |m(x+x_0)|^2\, dx_0$$

For real binary characters (i.e., intensity = 0 or 1), $$|c(x_0)|^2=|c(x_0)| \text{ and } |m(x)|^2=|m(x)| \text{ therefore}$$

$$R=\int |c(x_0)|\,|m(x+x_0)|\,dx_0$$

which is the correlation integral of $|c|$ with $|m|$. This equivalence and the fact that the phase distribution across the mask is unimportant, allows a transparency of the character to be used in the hologram construction.

The correlation function of an unknown character $c(x_o)$ with a plurality of known characters $m_1(x)$, $m_2(x)$ etc., will be a plurality of intensity distributions located in the output plane 35 and each will be centered at the position of the corresponding mask transparency for the known characters $m_1(x)$, $m_2(x)$ etc. providing $c(x_o)$ is centered on $x_o = 0$. However, if $c(x_o)$ is displaced by an amount $\bar{x}$, the intensity distribution located in the output plane 35 will be displaced from being centered at the position of the corresponding mask transparency by $\bar{x}$. Since the recognition process functions with intensities, the phase distribution of the recording beam across the mask transparency is not relevant.

A plurality of pinholes 36 positioned in the output plane 35 receive central intensity functions of various intensities from the hologram 12. However, only the pinhole aligned at the same angle as that used during the recording of the filter mask transparency 31 that most resembles the unknown character 11 will receive the intensity function having a maximum central value. When a negative mask has been used in the recording process, the pinhole will receive the intensity function having a minimum value. One of the photodetectors 37 positioned behind each of the pinholes 36 will sense the central value of the intensity function transmitted through the pinhole and produce a current signal 40 proportional to the central value of the intensity function. The photodetector current signals are processed in the postprocessor 41 to determine the particular photodetector that sensed the maximum peak value of the intensity function and produce an output signal 42 indicative of the known character that most closely resembles the unknown character 11. An alternate embodiment (not shown) would include replacing the pinholes 36 with optical fiber transmission lines, thereby enabling the photodetectors 37 to be positioned at remote locations from the output plane 35.

The alternate procedure for scaling the outputs of the photodetectors 37 referred to previously is comprised of sequentially recognizing known characters corresponding to each of the recorded characters. As each known character is recognized an intensity function having a maximum central valve impinges on one of the photodetectors 37 positioned behind the pinholes 34. This photodetector produces an electrical current signal that is coupled to one of a plurality of variable attenuator circuits (not shown) within postprocessor 41. Scaling is provided by determining initially the known character that produces the smallest electrical current output signal from its photodetector and then setting the corresponding variable attenuator for minimum attenuation. The corresponding variable attenuator for each subsequent known character recognized is then varied until each corresponding variable attenuator produces an output signal that is equal in amplitude to that produced in response to the smallest electrical current output signal from the photodetectors 37. In applications employing negative masks an intensity function having a minimum central value impinges on one of the photodetectors 37. The addition of appropriate biasing or inverter circuits to the input stages of postprocessor 41 will enable the alternate scaling procedure described to be used in these applications. The output signals from the variable attenuators may then be further processed in logic circuitry (not shown) within the postprocessor 41.

As stated previously, the term characters includes features and subfeatures of characters. When features are to be recognized the hologram is modified to incorporate mask filter functions matched to the desired features to be recognized. The postprocessor 41 in this system will include a threshold logic device for each detector whose function is to decide on the presence or absence of a feature based on the current generated by the corresponding photodetector. Subsequent combinatorial logic is included which then decides the identity of the unknown character based on the presence or absence of particular features.

Alternatively, the hologram may be modified to incorporate mask filter functions matched not to whole characters or to whole features but to individual subfeatures which consist of parts of features in a variety of displaced or rotated positions. The postprocessor 41 in this system will include a threshold logic device for each detector whose function is to decide on the presence or absence of the subfeatures. Subsequent combinatorial logic will then decide on the presence or absence of the feature itself. Sequential or simultaneous presentation of other subfeatures sets corresponding to the entire library of features will also be included together with combinatorial logic to decide the identity of the unknown character. This system can afford a measure of tolerance to mispositioning and rotation of the unknown characters at the expense of illumination or reading speed.

Although the system has been described in terms of its ability to function with quasi-monochromatic incoherent illumination, it should also be understood that the disclosed system will operate as described with coherent but spatially diffuse light. A laser beam reflected from a printed page would be a typical example of illumination having this property.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A lensless optical recognition device comprising holographic means for filtering impinging quasi-monochromatic incoherent illumination from an unknown character by transmission through said holographic means producing an intensity output signal, discriminator means for receiving said intensity output signal and passing a central value signal corresponding to the central value of said intensity output signal, detector means responsive to said central value signal producing an electrical signal in accordance with said central value signal, and signal processing means coupled to said detector means to receive said electrical signal and provide an output signal indicative of a known character that most closely corresponds to said unknown character.

2. A lensless optical recognition device as described in claim 1 in which said holographic means includes means for filtering impinging quasi-monochromatic incoherent illumination from a feature of an unknown character by transmission through said holographic means producing an intensity output signal, and said signal processing means includes logic means for determining the presence of said feature providing an output signal indicative of a known character having said feature.

3. A lensless optical recognition device as described in claim 1 in which said holographic means includes means for filtering impinging quasi-monochromatic incoherent illumination from subfeatures of an unknown character by transmission through said holographic means producing an intensity output signal, and said signal processing means includes logic means for determining the presence of said subfeatures providing an output signal indicative of a known character having said subfeatures.

4. A lensless optical recognition device as described in claim 1 in which said holographic means includes a plurality of interference patterns disposed over the useful area of said holographic means corresponding to each mask transparency of a plurality of mask transparencies of known characters.

5. A lensless optical recognition device as described in claim 1 in which said holographic means includes a plurality of interference patterns spatially positioned within separate areas over the useful area of said holographic means corresponding to a plurality of mask transparencies of known characters.

6. A lensless optical recognition device as described in claim 1 in which said holographic means includes a hologram having an emulsion of sufficient thickness to contain Bragg phase planes.

7. An optical recognition device as described in claim 1 in which said discriminator means includes a plurality of coplanar pinholes.

8. An optical recognition device as described in claim 1 in which said discriminator means includes a plurality of optical fiber transmission lines.

9. A lensless optical recognition device as described in claim 1 in which said detector means includes a plurality of photodetectors positioned behind said discriminator means.

10. An optical recognition device comprising holographic means having disposed therein an interference pattern recorded from a mask transparency of a known character for producing a correlated intensity output signal having a central value of intensity in response to impinging quasi-monochromatic incoherent illuminations from an unknown character which corresponds to said known character, discriminator means having an aperture disposed in the same position with respect to said holographic means as said mask transparency during recording and passing said central value of intensity, detector means coupled to said discriminator means for producing an optimum electrical signal in response to said central value of intensity, signal processing means coupled to said detector means providing an output signal indicating that said unknown character corresponds to said known character.

11. An optical recognition device comprising holographic means having disposed therein a plurality of interference patterns recorded from discretely positioned mask transparencies of known characters for producing a correlated intensity output signal having a central value of intensity in response to impinging quasi-monochromatic incoherent illumination from an unknown character, discriminator means having a plurality of apertures disposed with respect to said holographic means at positions corresponding to said discretely positioned mask transparencies during recording for passing said central value of intensity, detector means coupled to each of said plurality of apertures for producing an optimum electrical signal in response to said central value of intensity, signal processing means coupled to said detector means to receive said optimum electrical signal and provide an output signal indicative of a known character that most closely corresponds to said unknown character.

12. An optical recognition device as described in claim 11 in which said holographic means produces sequential correlated intensity output signals having central values of intensity in response to impinging quasi-monochromatic incoherent illumination from sequentially presented unknown characters at specific angles associated with said known characters, said discriminating means sequentially passes said central values of intensity, said detector means produces a series of optimum electrical signals in response to said central values of intensity and said processing means provides a series of output signals indicative of known characters that correspond most closely to said sequentially presented unknown characters.

* * * * *